Patented Nov. 20, 1945

2,389,539

UNITED STATES PATENT OFFICE 2,389,539

FOUNDRY COMPOSITION

Arnold Edward Pavlish and Chester Ronald Austin, Columbus, Ohio, assignors, by mesne assignments, to Peerpatco, Incorporated, Indiana, Pa., a corporation of Delaware No Drawing. Application July 23, 1943, Serial No. 495,899

8 Claims. (Cl. 22—188)

This invention relates to compositions used as binders for foundry purposes, and as well to foundry compositions employing those binders and to the art of producing those binders and foundry compositions.

One object of our invention is the provision of a bonding agent which is comparatively inexpensive, is comprised of readily available materials, is simple to prepare and is highly effective in use, only a minimum quantity being required to produce extremely advantageous results.

Another object is to provide a foundry binder which when intimately mixed with sand gives a foundry composition which displays extremely high green strength, only moderate dry strength, and high permeance to gases and vapors, which permits achieving faithful reproduction of detail in the casting, which is soft, easily workable and non-gelatinous and can be easily rammed in the molding flask about the pattern, which has a high sintering point with no baking of sand or burning on the casting, which collapses readily in interior sections of the mold after use and is easily recoverable, and which has low contraction both upon drying and at high temperatures.

Yet another object is to produce a mold composition in which our new binder is employed, which requires the handling of a minimum quantity of material, in which less dead clay is eventually left in the sand heap or system than has heretofore been possible, and in which the bonding composition exerts but little limiting effect on the permeance of the foundry composition itself.

Other objects and advantages will in part be obvious and in part pointed out hereinafter.

Our invention accordingly may be considered as residing in the combination of elements, mixtures of materials, and composition of ingredients, and in the several steps, and in the relation of each of the same to one or more of the others, all as described herein, the scope of the application of which is indicated in the claims.

As conducive to a more ready and thorough understanding of our invention, it may here be noted that it is usually required in the known foundry practice, as for example in preparing a mold composition, to mix a certain amount of a suitable bonding clay with silica sand. It is also conventional to substitute part of the clean or new sand by a certain quantity of burnt or bonded sand. Water is added until a moist, workable mass is produced, of proper consistency.

When the mold composition thus produced is rammed about a desired pattern, the same having first been positioned in the conventional molding flask, it is found that the added clay in the mold composition imparts thereto the essential elements of workability and strength. Particularly is this important as concerns that portion of the pattern in the cope or upper part of the mold, to prevent breaking, dropping or disintegration in drawing the pattern or in subsequent handling. Mold strength also is important in order that the mold may withstand the wash of molten metal.

On the other hand, the presence of a large percentage of clay is undesirable in that it adversely affects the permeance of the mold. For proper elimination of gas evolved upon contact of the hot-poured metal with the walls of the mold, high permeance of the mold is imperative. Such high permeability cannot be achieved, however, where a large percentage of bonding clay is present in the mold composition.

The proportion of bonding clay to sand which must be employed for satisfactory results in a particular instance depends upon a number of factors. For example, the type of work undertaken exerts a controlling influence. Large, heavy work requires a strong mold having strength sufficient to render the mold self-sustaining. Conversely, a comparatively weak mold is satisfactory where only small, light work is involved. When part of the sand is substituted by a burnt or used sand, then less fresh clay is required. This is because some clay is already present in the used material, and the clay is found to be reversible, and can be reused. Sands of smooth, rounded grains require more bonding material than do those having rough, irregular grains. Conversely, coarse grains require more binder than do the fine-grained sands. It is the usual practice to employ bonding clay in an amount ranging from 5% to 30% by weight of the dry ingredients of the mold composition.

Typical of the large number of bonding clays now in use are the fire clays and certain of the non-refractory clays. While these non-refractory clays have found favor in some classes of work, the fire clays, consisting largely of kaolinite, probably are most employed. These clays usually date back to the glacial age, and are commonly found in minerals of the sericite type.

Both types of clays, the refractory and non-refractory varieties, possess the advantage that they are available in numerous regions throughout the United States. Their greatest disadvantages, however, disadvantages tending to offset their advantageous ready availability, are that the use of the binder produces only a comparatively limited increase in the strength of the resulting foundry composition, and that the use of the large quantities of clay requisite to impart required mold strength severely diminishes the permeance of the mold. In practice, therefore, it is necessary to strike a compromise between these factors. The final result is unsatisfactory, measured from either standpoint.

Among the clays which are employed as a bonding substance is western bentonite. While certain advantages attend its use such as desired high permeability these are offset, at least in part, by certain serious disadvantages. To illustate, this clay is colloidal in character. While this in itself is by no means a disadvantage, western bentonite is found to swell considerably upon mixing with water, a procedure which is required when preparing a mold composition. Swelling of the binder attendant upon wetting is accompanied by marked increase in the volume of the mold compositions. Ramming about the pattern is rendered more difficult. Swelling, cutting and scabbing of the sand is observed. Difficulty is encountered in removing sand from the flasks at the end of a casting operation, due to mold-hardening during heating. Sand-hardening results in failure of the sand to collapse upon cooling. Particularly with respect to interior sections of the mold, and especially in malleable iron foundry practices, this property frequently gives rise to cracked castings. The wide variance between the expansion of the sand mold and that of the metal does not permit accommodation within the mold of the shrinkage of the metal attendant upon cooling. Moreover, this western bentonite, because of the high dry strength which it imparts, results in sand which after initial use is found to be lumpy. Much sand is lost during screening operations, and must be discarded, along with core butts, wedges and other refuse. Moreover, this western bentonite is available only in a comparatively few parts of the country. Its limited availability and cost of transportation of the raw product to many foundry locations in various parts of the country, coupled with the several important disadvantages alluded to, make it unfeasible to employ this binder in many regions, or in the production of small work of involved detail.

An object of our invention accordingly is to provide a bonding composition which is readily available on the market, which gives rise to a foundry composition which displays outstanding green strength coupled with only moderate dry strength, which can be used in smaller proportions than with heretofore known binders, thus permitting a high degree of permeance, which flows readily and rams easily and closely about a pattern, which permits the handling of a smaller quantity of material than has hitherto been possible, in which less dead clay is eventually left in the sand heap or system, which gives a mold composition of high sintering point which readily collapses in interior sections, which does not contract objectionably in the mold flask at high temperatures, and which permits high degree of recovery of the mold composition after use.

Giving consideration now to the practice of our invention, we find that southern bentonites, such as described in the U. S. Letters Patent 2,180,897, issued to Norman J. Dunbeck on November 21, 1939, and entitled Composition, display excellent bonding properties, and are of frequent occurrence in various parts of the country, as for example in Arkansas, Louisiana, Mississippi, and Alabama. These are non-swelling, colloidal montmorillonite clays. The term "colloidal" as accepted in the art with respect to bonding clays is defined in the aforementioned patent as indicating a clay consisting of fine particles of one micron or less. The derivation of the name "southern bentonite" for these non-swelling montmorillonite clays is set forth in detail in that patent. It is disclosed therein that southern bentonite, because of the comparatively high green compression strength imparted to a foundry composition, can be used in small quantities, giving rise to a foundry composition of high permeability.

It is frequently required, however, to produce castings which while of intermediate weight, are intricate in detail. Foundry compositions employing western bentonite and other similar bonding agents are not satisfactory for this detailed work since upon drying and burning these compositions harden, and resist shrinking of the cast metal. Cracks and breaks in the casting frequently result. Moreover, especially high permeance is required when handling this type of work. For those reasons it is important in such cases to employ a minimum of binder, so that the limiting effect of the latter will be reduced to the lowest possible degree. In such cases the possibility of decreasing even to a very slight extent the proportion of binder which is required constitutes a distinct and important advance in the art. However, with southern bentonite already employed in a proportion of only about 5% by weight of the ingredients of the foundry composition, it has heretofore been impossible to reduce further the percentage of bonding agent while imparting to the composition the strength necessary to support the increased weight of the casting.

We have found that admixture to the southern bentonite bonding agent of various percentages by weight of the sulphates of calcium, either crystalline or anhydrous, give rise to remarkably increased green strength of the foundry composition without appreciable change in the dry strength of the resulting composition and with practically no change in its permeance. We are by no means certain why it is that these additives produce such marked and surprising increase in strength, but perhaps this new and highly advantageous phenomenon may be attributed to some cementing action of the sulphate additive. It is not at all conclusive, however, that this is the correct explanation of this increased resistance to compression stresses, and we advance it only as a possibility, and do not desire to be bound by this suggested theory. The really important fact demonstrated by actual tests and giving vitality to our invention, is that, regardless of the reason, marked increase in green strength is attendant upon the admixture to sand of a bonding agent comprised largely of bentonite, but to which has been added a controlled percentage of one or more of the sulphates of calcium.

Among the sulphates which we have employed with success in carrying out the practice according to our invention may be included anhydrous calcium sulphate ($CaSO_4$). The suggested possibility of cementing action is substantiated in part by the observation from test data that the percentage of sulphate added to the clay does not appear to be critical, and good results are obtained with wide range of percentage of added sulphate.

As an illustrative embodiment of our invention, directing attention to the production of a foundry mold according to our invention, we add to clean silica sand, or silica sand containing a desired proportion of clean sand, only about 4% by weight of a bonding agent. This bonding agent itself may consist in large proportion of the non-swelling colloidal bentonite clay or sub-bentonite, illustratively an acid bentonite, (pH value less than 7 in aqueous solution) known under the general name of southern bentonite, and which has heretofore been discussed in detail. To this bentonite is intimately mixed a suitable percentage of one or more of the sulphates of calcium. In the illustrative embodiment, 70% by weight of southern bentonite is mixed with 30% by weight of anhydrous calcium sulphate (CaSO$_4$), the total quantity of bonding agent constituting about 4% of the dry ingredients.

The dry ingredients of the binder are first intimately mixed in the usual factory mixer. Thereafter the binder is mixed with the sand to obtain a fairly uniform consistency. Water is then added in desired quantity, ordinarily about 2 to 5% by weight, and illustratively 2½%. Continued mixing results in a uniform mix of desired high green strength. The mold composition is then ready for preparing a sand mold in accordance with known technique.

Our new composition is easily handled. It displays extremely high green strength, only moderate dry strength, and high permeance. The sand flows freely, is not gummy or sticky, and is readily rammed tightly about a pattern, closely conforming to the details thereof. The strong durable mold is well-retained in the cope as the pattern is drawn, and is clean-cut and free of edge breaks and cracks. Accordingly, only a minimum of repair is required to the mold before use.

Moreover, the new mold composition is well adapted for practical use. Increased green compression strength is displayed by samples of our mold composition under actual test conditions. Dry strength is increased, and permeability is increased somewhat even over known compositions which have heretofore been characterized by their high permeability. In carrying out the tests referred to, for example, sample mixes were prepared comprising 96% green, unbonded silica sand with 4% by weight of each bonding agent. These ingredients were mulled in a laboratory muller, and then tested according to the procedure recommended by the American Foundrymen's Association. The water content in each case was 2½% by weight. The test data are conveniently presented in the following table, 96% sand being employed in the first and third cases, and 95% sand in the second case:

| Foundry composition | Green compression strength | Dry compression strength | Green permeability |
|---|---|---|---|
| Silica sand and binder in amounts noted— | Pounds per sq. in. | Pounds per sq. in. | A. F. A. units |
| 4% untreated southern bentonite | 7.9 | 45 | 275 |
| 5% untreated southern bentonite | 12.38 | 27.9 | 181 |
| 4% mixture (70% southern bentonite, 30% gypsum) | 12.5 | 41 | 275 |

It is noted from the data set forth in the foregoing table, cases 1 and 3, that employing the same low percentage of binder, we achieve about 58% higher green strength than when southern bentonite alone is employed as the bonding agent, with practically no effect on the dry strength. At the same time, the high green permeability is left substantially unchanged. Again, comparing the test results concerning cases 2 and 3, it will be seen that approximately 4% by weight of our binder gives the same and even slightly higher green compression strength than does a larger percentage of southern bentonite. In other words, about the same green strength can be achieved with about 25% less of our treated binder as can be obtained with southern bentonite alone. Additionally, the test data as concerns cases 2 and 3 strikingly illustrate the great and desirable increase in the green permeability of the mold composition upon decrease in the percentage of the binder employed.

In the prior Patent 2,180,897 it is stated that compositions containing southern bentonite as a bonding agent have high green strength, high permeance, moderate dry strength, good flowability and ramming qualities, high sintering point and low contraction at high temperatures. The new composition according to our present invention, retains all of these desirable qualities, and in addition gives rise to substantially higher green strength than has heretofore been possible with southern bentonite alone. All this is achieved with increase in permeance of the composition, a phenomenon attributable in part to the feasibility of using smaller proportions of binder than has heretofore been possible.

Our new composition may be worked faster at lower moisture content than hitherto. This diminished water content is particularly important. It is this reduction in moisture content which gives a decrease in the gases driven off from the mold when pouring. Faster mixing is important in large foundries where only limited mixing time is available.

The castings formed in these molds are substantially free of fins, scabs and like imperfections heretofore observed. This may be attributed in large measure to the low coefficient of contraction of these molds at high temperatures. This value, for example, is observed to be only about 0.05% at 2500° F.

Attention has heretofore been directed to the fact that the increase in green strength attendant upon the inclusion of one or more sulphates of calcium in the binder is accompanied by increase in permeance of the mold composition. This is an important and surprising result. With most clays permeability decreases as the green strength of the composition increases. It is particularly noteworthy that green permeability has a value of 275 for tests 1 and 3 in the foregoing table, while that value is only 181 when 5% of southern bentonite is employed as a binder as in test 2. Always the highest possible green strength is sought by foundrymen. High green strength permits the use of a minimum of clay, resulting in high permeability, less dead clay and fines in the sand, as well as other advantages which will readily be apparent to those skilled in the art.

It should be noted that the dry strength of our mold composition is of moderate value, as a result whereof the sand may readily be shaken out from the flask after use, and recovered for further use. Moreover, this moderate dry strength permits ready cleaning of the castings, and enables them more quickly to be conditioned for placing into service. The sand of interior sections of the mold collapses readily, permitting the metal to contract freely during cooling, and ensuring freedom from cracking of the cast piece.

While in the illustrative embodiment forming the subject of actual tests carried out by us, and data concerning which is tabulated in the foregoing table, the percentage by weight of gypsum employed in the binder was 30%, this value is not at all closely critical, and we have obtained increased green strength with high permeability in a foundry composition when using from as low as ½ to as high as 50% by weight of one or more of the sulphates of calcium in the bonding agent. Probably this is due to some cementing action being obtained whenever the calcium sulphates are added to the bonding agent. However, the most highly advantageous results are achieved with the use of about 30% calcium sulphate, and at the present time this is the percentage which we prefer to employ.

Likewise, while the amount of clay or bonding material is illustratively given as about 4% by weight of the sand with which it is mixed, advantageous results can be obtained when the bonding clay ranges from about 2% to 8% by weight. In fact, where part of the sand consists of burnt sand, then since the bonding clay is reversible in character to a certain degree and can be used over again, these proportions can be extended from ½ to 8%.

Similarly, while the illustrative embodiment has disclosed the use of gypsum as the sulfate of calcium additive, almost equally good results are achieved when either plaster of Paris or anhydrous calcium sulphate are employed as the additive to the bonding agent. In like manner, any two, or all three of these additives may be admixed in any desired proportions; whereupon good results are observed to attend the use of this composite additive.

It is to be noted that the various ingredients making up the mold composition may be mixed together in any desired sequence. For example, the bonding agent may be mixed with sand, and the mixed sand thereupon added to sand systems or heaps, to maintain a satisfactory volume thereof. Usually, however, the mixer binder is added to sand heaps or a sand system as required. Where desired the bond clay is added to sand and the calcium sulphate subsequently added. It will be recognized that the foundry composition may be prepared in a variety of sequential steps.

While in the illustrative embodiment southern bentonite has been named as the bonding clay to which the sulphates of calcium are added, it is to be noted that improved green strengths, together with improved green permeability, are obtained in foundry compositions employing binders consisting of these sulphates admixed with western bentonite or with fire clay, and we intend that our invention shall include these possible compositions, these various clays sometimes being referred to herein by the generic term refractory clays. Western bentonite is employed, for example, where it is readily available, or where high dry strength is required, as in casting large work.

Likewise for purposes of illustration, we have disclosed a mold comprising silica sand together with our new bonding agent. Clearly, however, our invention is applicable to like combinations of sand and binder for other foundry uses. Thus green sand cores, dry sand cores, facing sands, and the like, are contemplated consisting of various combinations of new silica sand, burnt silica sand, new molding sand, burnt molding sand, lake sand, or bank sand, together with our new bonding agent. Where desired, auxiliary binders may be added in small quantities. These include cereal binders, cement, goulac, pitch or rosin. Additionally, a cleaning element for the castings may be added, such as sea coal, wood flour, or oils.

Thus it will be seen that there has been provided in our invention a foundry composition in which the various objects hereinbefore stated, together with many practical advantages, are successfully achieved. The compositions are found to possess certain superior green strength as compared to compositions heretofore employed. Smaller proportions of binder may be employed without decreasing the green strength. Permeability of the composition is increased.

As many possible embodiments may be made of our invention, and as many changes may be made in the embodiments hereinbefore set forth, it is to be understood that all matter described herein is to be interpreted illustratively, and not in a limiting sense.

We claim:

1. In a composition of matter, a foundry binder consisting essentially of a bentonite clay together with ½% to 50% by weight of one or more of the compounds selected from the group consisting of anhydrous calcium sulphate, plaster of Paris, and gypsum.

2. In a composition of matter, a foundry binder consisting essentially of a bentonite clay together with about ½ to 50% by weight of one or more of the sulphates of calcium.

3. In a composition of matter, a mold composition comprising in combination, silica sand and a small percentage of binder consisting essentially of bentonite together with ½ to 50% by weight of one or more of the compounds selected from the group consisting of anhydrous calcium sulphate, plaster of Paris, and gypsum.

4. In a composition of matter, a foundry composition comprising in combination, about 96% silica sand, and about 4% by weight of binder, itself consisting essentially of southern bentonite with about ½ to 50% by weight of calcium sulphate.

5. In a composition of matter, a foundry composition comprising in combination, silica sand and a small quantity of binder, itself consisting essentially of about 70% by weight of bentonite and about 30% by weight of calcium sulphate.

6. In a composition of matter, a foundry composition comprising in combination, about 99½ to 92% by weight silica sand, and about ½ to 8% by weight of a binder, the binder itself consisting essentially of southern bentonite together with about ½ to 50% by weight calcium sulphate.

7. In preparing a mold composition for foundry purposes, the art which includes mixing with sand a small amount of binder consisting of southern bentonite with about ½ to 50% by weight of one or more of the sulphates of calcium, and about 2 to 5% of water.

8. In preparing a mold composition for foundry purposes, the art which comprises mixing about 96% silica sand with about 4% by weight of the dry ingredients of a binder which itself comprises about 70% southern bentonite and about 30% by weight of calcium sulphate, and sufficient water to plasticize the mass.

ARNOLD EDWARD PAVLISH.
CHESTER RONALD AUSTIN.